United States Patent
Irmscher et al.

[15] 3,681,409
[45] Aug. 1, 1972

[54] 9α-FLUORO-16-FLUOROMETHYLENEPREDNISOLONE-21-ENANTHATE AND PROCESS FOR THE PREPARATION THEREOF

[72] Inventors: Klaus Irmscher; Gerhard Cimbollek; Hans-Gunther Kraft; Jurgen Harting, all of Darmstadt, Germany

[73] Assignee: Merck Patent Gesellschaft mit beschrankter Haftung, Darmstadt, Germany

[22] Filed: Feb. 6, 1970

[21] Appl. No.: 9,408

[30] Foreign Application Priority Data

Feb. 11, 1969  Germany............P 19 06 586.2

[52] U.S. Cl..............................260/397.45, 424/243
[51] Int. Cl.............................................C07c 169/32

[58] Field of Search...............................260/397.45

[56] References Cited

UNITED STATES PATENTS 3,161,661  11/1964  Von Werder et al......260/397.4

FOREIGN PATENTS OR APPLICATIONS 939,510  10/1963  Great Britain...........260/397.45

*Primary Examiner*—Elbert L. Roberts
*Attorney*—Millen, Raptes & White

[57] ABSTRACT

9α-fluoro-16-fluoromethyleneprednisolone-21-enanthate has high anti-proliferative activity with relatively little glyconeogenetic and adrenal atrophy side effects when administered to mammals having a skin disease such as psoriasis.

2 Claims, No Drawings

9α-FLUORO-16-FLUOROMETHYLENEPREDNISOLONE-21-ENANTHATE AND PROCESS FOR THE PREPARATION THEREOF

BACKGROUND OF THE INVENTION

This invention relates to a 21-ester of a 9α-fluoro-16-substituted-prednisolone, more particularly to the 21-enanthate of 9α-fluoro-16-fluoromethylene-prednisolone and to its topical use in the treatment of skin conditions responsive to steroidal anti-inflammatory therapy.

U.S. Pat. No. 3,065,239 discloses a class of compounds of the formula:

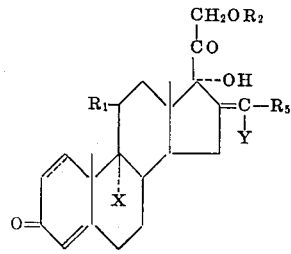

wherein, inter alia, $R_1$ can be OH, $R_2$ can be lower alkanoyl, $R_5$ can be H, and X and Y can be halogen. Specifically, that patent discloses 9α-fluoro-16-fluoromethylene-prednisolone 21-acetate. The patent discloses the above class of compounds has anti-inflammatory activity. However, it does not describe the specific compound of this invention nor its excellent anti-proliferative activity. As used herein, "anti-proliferative activity" means the inhibition of mitosis of fibroblast-cells and/or epidermis-cells. The results of the inhibition of mitosis of the fibroblast is measured by the reduction of proliferative tissue in the granuloma test. In the so-called mousetail-test the decrease of the mitotic activity leads to a reduction of the epidermal thickness.

SUMMARY OF THE INVENTION

The compound of this invention, which has the formula

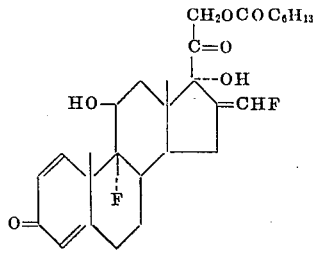

has high anti-proliferative activity useful in the treatment of psoriasis and like skin diseases.

OBJECTS OF THE INVENTION

It is an object of this invention to provide 9α-fluoro-16-fluoromethylene-prednisolone-21-enanthate. It is another object to provide a process for the preparation thereof. It is a further object to provide pharmaceutical compositions embodying the compound of this invention, particularly those adapted for topical use. A further object is the provision of a method of obtaining an anti-proliferative effect in mammals, particularly humans, and for the treatment of the skin diseases described herein employing the compound of this invention. Other objects will be apparent to those skilled in the art to which this invention pertains.

DETAILED DESCRIPTION OF THE INVENTION

9α-fluoro-16-fluoromethylene-prednisolone-21-enanthate (I) has 4.5 times the anti-proliferative effect of the known fluprednylidene-21-acetate in the caudal test on mice (test methodology, cf. "Arzneimittelforschung" [Medical Research], Vol. 18, pp. 19 et seq. [1968]). Moreover, the compound of this invention exhibits a lower incidence of undesirable side effects. For example, it has a glyconeogenetic effect which is about 2.4 times weaker, and an adrenal weight reducing effect which is about 2.2 times weaker than fluprednylidene-21-acetate (test methodology, cf. "Arzneimittelforschung" [Medical Research], Vol. 18, pp. 15 et seq. [1968]). Consequently, the compound of this invention is suitably employed as a therapeutic agent and preferably is applied topically, for example for the treatment of psoriasis and other inflammatory skin diseases of exsudative and proliferative character such as eczema vulgare, microbial eczema, dyshidrotic eczema, allergic contact dermatitis, congestive eczema in ulcus cruris, intertrigo, dermatitis toxica, seborrheic eczema, erythroderma desquamativum Leiner, seborrheic erythrodermia of the aged, endogenic eczema, neurodermatitis circumscripta, insect stings, dermatitis solaris (sunburn), first and second degree burns and cauterizations, dermatitis bullosa striata pratensis, lichen ruber planus, psoriasis vulgaris, erytheme posterosive, non-fungus balanitis, herpes simplex and erythrasma.

To produce the compound of this invention, 9α-fluoro-16-fluoromethyleneprednisolone or a lower 21-ester thereof can be esterified or transesterified with enanthic acid or a reactive derivative thereof, e.g., its acid chloride, anhydride or a lower-alkyl ester thereof.

When employing enanthic acid as the esterification agent for the esterification of 9α-fluoro-16-fluoromethylene-prednisolone, the reaction is suitably conducted in an inert organic solvent, e.g., benzene or toluene, optionally in the presence of an acidic catalyst, e.g., p-toluenesulfonic acid or boron trifluoride. It is advantageous to remove the water produced during the reaction by azeotropic distillation.

It is also advantageous to employ reactive derivatives of enanthic acid, e.g., enanthic acid chloride, enanthic acid bromide, or enanthic acid anhydride, preferably in the presence of a base, e.g., dilute sodium hydroxide solution, pyridine, or triethylamine, preferably a base which can simultaneously serve as the solvent. It is also possible to employ an additional inert solvent, e.g., benzene or toluene. The esterification is normally conducted at room temperature, but proceeds more quickly with heating. Suitable reaction temperatures range between about 0° and 120°C., preferably between 20°and 80°C. The reaction times range between about 1 hour and 7 days, depending on the selected temperature.

Esterification can also be achieved by transesterification. For example, 9α-fluoro-16- fluoromethyleneprednisolone can be reacted with a large excess of a lower-alkyl ester of enanthic acid, e.g., methyl enanthate or ethyl enanthate, or 9α-fluoro-16-fluoromethyleneprednisolone-21-acetate or other lower-alkanoic 21-ester of 9α-fluoro-16-fluoromethyleneprednisolone can be reacted with a large excess of enanthic acid, in the presence of a suitable catalyst, to produce the compound of this invention. The latter method is advantageous, because the 21-acetate can be obtained by the 21-acetoxylation of 9α-fluoro-11β,17α-dihydroxy-16-fluoromethylene-1,4-pregnadiene-3,20-dione in the conventional manner and this ester can be converted without saponification to the free 21-alcohol directly to the desired 21-enanthate (I). The transesterification agent, e.g., a lower ester of enanthic acid or enanthic acid itself, can be employed as the reaction solvent. The reaction can also be conducted in the presence of an additional inert solvent. The boiling point of the inert solvent is preferably higher than that of the alcohol of the enanthic acid ester employed or higher than acetic acid if the 21-acetate ester is employed. Advantageously, a solvent is employed which forms an azeotropically boiling mixture with this alcohol or with acetic acid so that the thus-produced lower-aliphatic alcohol or acetic acid formed during the transesterification is distilled off from the reaction mixture, thereby shifting the equilibrium in favor of the desired ester (I). Particularly suitable solvents are the hydrocarbons, e.g., benzene, toluene and xylene. Suitable catalysts for the transesterification are small amounts of bases or basic-reacting salts, e.g., potassium enanthate, and acids, e.g., p-toluene-sulfonic acid. Although the transesterification takes place at room temperature, it is more advantageous to conduct the reaction with heating, suitably at the boiling temperature under constant distillation of the liberated acetic acid or alcohol.

The compound of this invention can be employed as a mixture with solid, liquid and/or semi-liquid pharmaceutical excipients in the human or veterinary medicine. Suitable carrier substances are organic or inorganic compounds which are suitable for parenteral, enteral, or preferably topical application, which do not react with (I), such as, for example, one or more of water, vegetable oils, polyethylene glycols, gelatin, lactose, amylose, magnesium stearate, talc, mineral oil, vaseline and cholesterol. For parenteral application, particularly suitable are solutions, preferably oily solutions, as well as suspensions or emulsions. Suitable for enteral application are tablets, dragees, syrups, juices, and suppositories. For topical application, the compound of this invention can be formulated into solutions, suspensions and emulsions, e.g., salves, creams, lotions, tinctures, also aerosols, or powders. The above-mentioned pharmaceutical preparations can, if desired, be sterilized or mixed with auxiliary agents, such as, for example, preservatives, stabilizers, wetting agents, salts for influencing osmotic pressure, buffers, colorings, flavorings, and/or aromatics.

The compound of this invention is administered orally preferably in a dosage of 0.3–6 mg., especially 1–3 mg., as a mixture with 1–5,000 mg., preferably 50–500 mg., of the pharmaceutical carrier per dosage unit. The content thereof in pharmaceutical preparations adapted for the topical application preferably is between 0.01 and 1 percent by weight, more preferably between 0.025 and 0.1 percent by weight.

The anti-proliferative effect of the compound of this invention can be demonstrated according to the published procedure cited above. In this procedure, in accordance with the method of JARRETT and SPEARMAN (Histochemistry of the Skin-Psoriasis, English Universities Press Ltd., London, 1964) male mice (mean body weight: 20–30 g) are treated with the test compounds daily for 10 days. Various concentrations of the test compounds are suspended in peanut oil, applied to the tail and rubbed in mechanically from the root to the tip (volume applied: 0.1 ml/animal). The controls are merely subjected to treatment with the suspension vehicle. The animals are sacrificed on the day after the last application. A segment from the central third of the tail is dissected and, after removal of the tail bones, fixed in Bouin's solution for histological processing (consisting of formaldehyde solution, glacial acetic acid and a saturated solution of trinitrophenol), embedded in paraffin and cut into sections. The histological sections are stained with hematoxylin-eosin. Subsequently, the epidermal thickness is measured microscopically by means of a calibrated ocular micrometer, each histological section being examined in three different places. The mean per animal is calculated from a total of 24 tail measurements and used for the determination of the mean of each experimental group.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, the temperatures are set forth in degrees centigrade.

EXAMPLE 1

12.1 g. of 9α-fluoro-16-fluoromethyleneprednisolone is dissolved in 120 ml. of absolute pyridine, mixed with 4.85 g. of enanthic acid chloride, and allowed to stand at room temperature for 2 days. The reaction mixture is stirred into 2 l. of ice water; the precipitate is vacuum-filtered, washed with water, dried, and chromatographed on 150 g. of silica gel with chloroform/acetone (9:1). The fractions containing the desired substance are combined, evaporated, and the residue recrystallized from ether, thus obtaining 9α-fluoro-16-fluoromethyleneprednisolone-21-enanthate, m.p. 202°–204°.

EXAMPLE 2 ten g. of 9α-fluoro-16-fluoromethyleneprednisolone-21-acetate is mixed with 40 ml. of enanthic acid and 1 g. of potassium enanthate. The mixture is gently heated at 12 mm., so that enanthic acid and thus-formed acetic acid distil over slowly. After 5 hours, the reaction mixture is cooled, the residue is taken up in chloroform, and washed successively with saturated $NH_4Cl$ solution, $NaHCO_3$ solution, and water. After removing the chloroform, chromatographing the reaction product (silica gel, chloroform/acetone 9:1), and crystallizing the residue from ether, 9α-fluoro-16-fluoromethyleneprednisolone-21-enanthate is obtained, m.p. 202°–204°.

The following examples relate to pharmaceutical preparations of the novel compound:

EXAMPLE A

Tablets
Each tablet contains:
| | |
|---|---|
| 9α-Fluoro-16-fluoromethyleneprednisolone-21-enanthate | 2 mg. |
| Lactose | 70 mg. |
| Corn starch | 27 mg. |
| Magnesium stearate | 1 mg. |

EXAMPLE B

Dragees (Coated Tablets)
Each dragee contains:
| | |
|---|---|
| 9α-Fluoro-16-fluoromethyleneprednisolone-21-enanthate | 3 mg. |
| Lactose | 80 mg. |
| Wheat starch | 15 mg. |
| Talc | 2 mg. |

The coating (150 mg.) is a mixture of corn starch, sugar, talc, and tragacanth.

EXAMPLE C

Injection Solution

A solution of 200 g. of 9α-fluoro-16-fluoromethylene-prednisolone-21-enanthate in 99.8 kg. of sesame oil is prepared and filled into ampoules so that each ampoule contains 2 mg. of the above-mentioned active substance.

EXAMPLE D

Salve
| | |
|---|---|
| 9α-Fluoro-16-fluoromethyleneprednisolone-21-enanthate | 0.1% |
| Lanolin (anhydrous) | 1.9% |
| Paraffin oil (thickened) | 10.0% |
| Vaseline, white | 88.0% |

EXAMPLE E

Salve
| | |
|---|---|
| 9α-Fluoro-16-fluoromethyleneprednisolone-21-enanthate | 0.025% |
| Cetyl alcohol | 2.975% |
| Lanolin (anhydrous) | 1.0% |
| Paraffin oil (thickened) | 15.0% |
| Vaseline, white | 81.0% |

EXAMPLE F

Cream
| | |
|---|---|
| 9α-Fluoro-16-fluoromethyleneprednisolone-21-enanthate | 0.1% |
| Cetyl alcohol | 9.0% |
| Paraffin oil (thickened) | 3.0% |
| Glycerol monostearate | 2.0% |
| Propylene glycol monostearate | 2.0% |
| Glycerin | 2.0% |
| Extremely finely divided silicic acid | 0.1% |
| Vaseline | 9.7% |
| Polyoxyethylene sorbitan monopalmitate | 30.0% |
| Methyl p-hydroxybenzoate | 0.07% |
| Propyl p-hydroxybenzoate | 0.03% |
| Propylene glycol | 3.0% |
| Water | 39.0% |

EXAMPLE G

Cream
| | |
|---|---|
| 9α-Fluoro-16-fluoromethyleneprednisolone-21-enanthate | 0.05% |
| Mixture of cetyl and octadecyl alcohol | 9.0% |
| Vaseline, white | 32.0% |
| Paraffin oil (thickened) | 3.0% |
| Neutral, low-viscosity oil on vegetable basis (mixture of triglycerides) | 2.0% |
| Polyoxyethylene sorbitan monopalmitate | 6.0% |
| Glycerol monostearate | 3.0% |
| Sorbic acid | 0.19% |
| Perfume oil | 0.01% |
| Extremely finely divided silicic acid | 0.25% |
| Glycerin | 5.5% |
| Water | 39.0% |

EXAMPLE H

Lotion
| | |
|---|---|
| 9α-Fluoro-16-fluoromethyleneprednisolone-21-enanthate | 0.1% |
| Paraffin oil (thickened) | 10.0% |
| Ethanol | 2.0% |
| Glycerin | 1.0% |
| Propylene glycol | 2.0% |
| Sorbic acid | 0.15% |
| Fatty alcohol polyglycol ether | 2.0% |
| Mixture of cetyl stearyl alcohol, sodium salt of cetylstearylsulfuric acid, and nonionic emulsifier | 0.5% |
| Perfume oil | 0.01% |
| Water | 82.24% |

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. 9α-Fluoro-16-fluoromethyleneprednisolone-21-enanthate.

* * * * *